US012625233B1

(12) United States Patent
Williams

(10) Patent No.: US 12,625,233 B1
(45) Date of Patent: May 12, 2026

(54) MEASUREMENT OF ELECTROMAGNETIC SPECTRAL PROPERTIES

(71) Applicant: General Radar Corporation, Belmont, CA (US)

(72) Inventor: Jon Williams, San Francisco, CA (US)

(73) Assignee: General Radar Corporation, Belmont, CA (US)

( * ) Notice: Subject to any disclaimer, the term of this patent is extended or adjusted under 35 U.S.C. 154(b) by 530 days.

(21) Appl. No.: 18/078,058

(22) Filed: Dec. 8, 2022

Related U.S. Application Data

(60) Provisional application No. 63/289,366, filed on Dec. 14, 2021.

(51) Int. Cl.
    G01S 7/41       (2006.01)
    G01S 7/35       (2006.01)

(52) U.S. Cl.
    CPC .............. G01S 7/412 (2013.01); G01S 7/356 (2021.05); *G01S 7/417* (2013.01)

(58) Field of Classification Search
    CPC combination set(s) only.
    See application file for complete search history.

(56) References Cited

U.S. PATENT DOCUMENTS

| | | | |
|---|---|---|---|
| 8,344,937 B2 | 1/2013 | Drake et al. | |
| 8,897,571 B1 * | 11/2014 | Robinson | G06V 20/13 356/302 |
| 9,103,671 B1 * | 8/2015 | Breed | G01S 13/865 |
| 2014/0070983 A1 * | 3/2014 | Maalouli | G01S 13/02 342/192 |
| 2020/0309933 A1 * | 10/2020 | Ray | G01S 13/282 |

FOREIGN PATENT DOCUMENTS

| | | | | |
|---|---|---|---|---|
| CN | 112395953 A | * | 2/2021 | G06V 20/13 |

* cited by examiner

*Primary Examiner* — Vladimir Magloire
*Assistant Examiner* — Eric K Hodac
(74) *Attorney, Agent, or Firm* — Fish & Richardson P.C.

(57) ABSTRACT

Disclosed are methods, systems, and computer-readable medium to perform operations to classifying airfield debris. The operations include generating a series of frequency-modulated chirps having respective frequencies across a frequency range and directed toward a location of an object in an airfield. The operations can include receiving a series of reflections corresponding to a plurality of frequency-modulated chirps in the series of frequency-modulated chirps and generating a two-dimensional frequency-swept spectral signature representing properties of the plurality of received reflections across a frequency range. The operations can include providing the two-dimensional frequency-swept spectral signature as input to a machine learning classifier that is trained to predict characteristics of objects from frequency-swept spectral signatures and receiving an output representing a predicted classification of the object as airfield debris or not airfield debris.

20 Claims, 6 Drawing Sheets

100

200

*310*

*320*

*410*

Frequency (GHz)

*420*

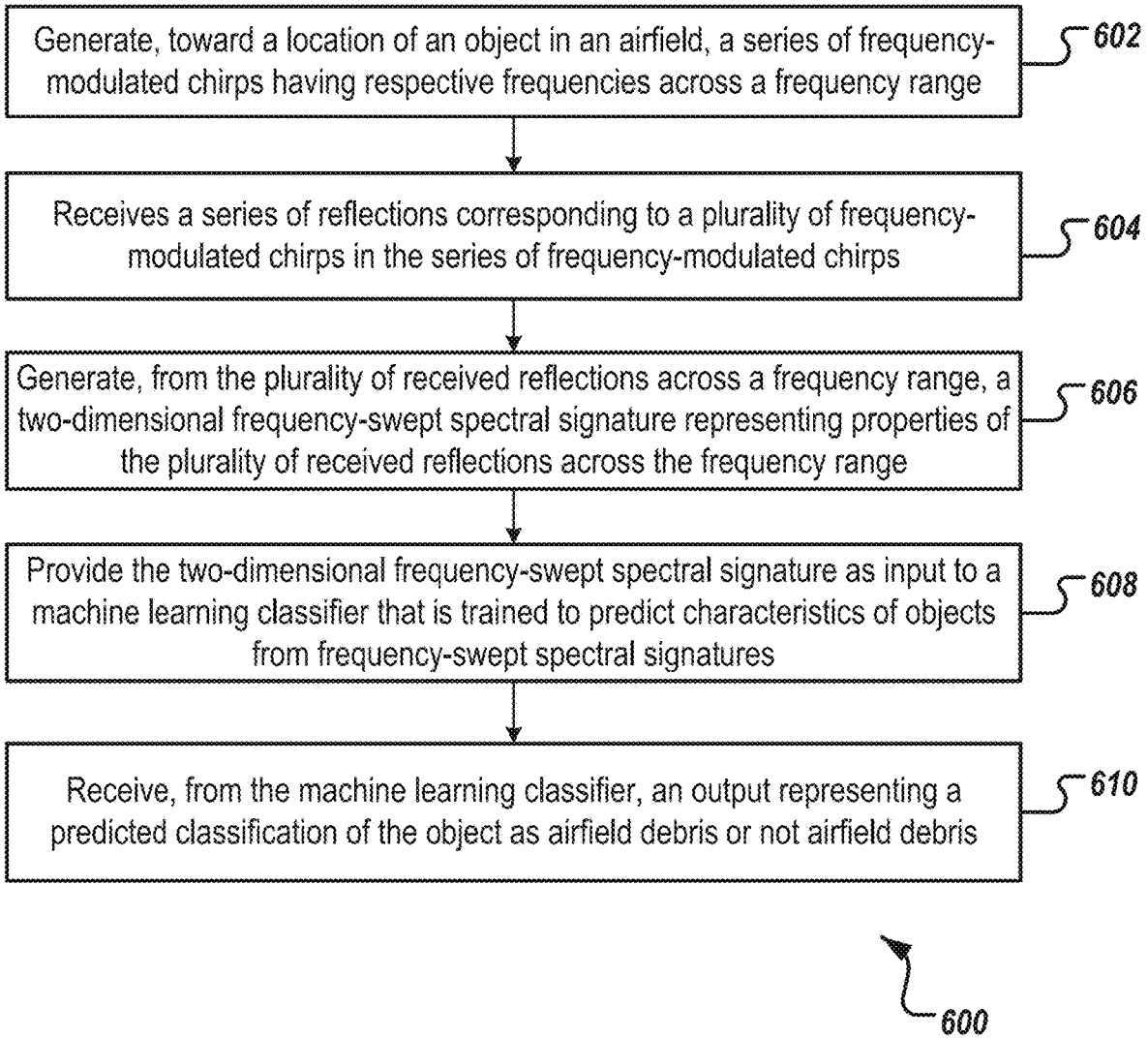

Generate, toward a location of an object in an airfield, a series of frequency-modulated chirps having respective frequencies across a frequency range        602

Receives a series of reflections corresponding to a plurality of frequency-modulated chirps in the series of frequency-modulated chirps        604

Generate, from the plurality of received reflections across a frequency range, a two-dimensional frequency-swept spectral signature representing properties of the plurality of received reflections across the frequency range        606

Provide the two-dimensional frequency-swept spectral signature as input to a machine learning classifier that is trained to predict characteristics of objects from frequency-swept spectral signatures        608

Receive, from the machine learning classifier, an output representing a predicted classification of the object as airfield debris or not airfield debris        610

MEASUREMENT OF ELECTROMAGNETIC SPECTRAL PROPERTIES

CROSS-REFERENCE TO RELATED APPLICATIONS

This application claims benefit of U.S. Provisional Application No. 63/289,366, filed Dec. 14, 2021, the contents of which is hereby incorporated by reference in its entirety.

BACKGROUND

Radio detection and ranging (radar) and other range-finding systems determine the presence, distance and/or velocity of objects (e.g., aircraft). Radars determine these properties by transmitting electromagnetic waves and receiving a reflection off of the objects.

SUMMARY

Radar can be used to detect and classify foreign object debris (FOD) on airfields. Objects can be classified by controlling frequencies of waves (e.g., through sweeps or chirps) transmitted from a frequency modulated continuous wave (FMCW) radar system. The radar system can receive reflections corresponding to the transmitted radio frequency (RF) waves (e.g., microwaves), and determine a spectral signature of the objects. The spectral signature can be used to determine properties of the objects. In some examples, an empty runway (e.g., free from vehicles, people, aircraft) can be scanned with RF waves, and the radar system can classify the object (e.g., as debris or not debris).

In general, one innovative aspect of the subject matter described in this specification can be embodied in methods that include the actions of generating, using a radar transmit subsystem directed toward a location of an object in an airfield, a series of frequency-modulated chirps having respective frequencies across a frequency range; receiving, using a radar receive subsystem, a series of reflections corresponding to a plurality of frequency-modulated chirps in the series of frequency-modulated chirps; generating, from the plurality of received reflections across a frequency range, a two-dimensional frequency-swept spectral signature representing properties of the plurality of received reflections across the frequency range; providing the two-dimensional frequency-swept spectral signature as input to a machine learning classifier that is trained to predict characteristics of objects from frequency-swept spectral signatures; and receiving, from the machine learning classifier, an output representing a predicted classification of the object as airfield debris or not airfield debris.

The previously-described implementation can be performed using a computer-implemented method; a non-transitory, computer-readable medium storing computer-readable instructions to perform the computer-implemented method; a processor including circuitry to execute one or more instructions that, when executed, cause the processor to perform the computer-implemented method; and a computer system including a computer memory interoperably coupled with a hardware processor configured to perform the computer-implemented method or the instructions stored on the non-transitory, computer-readable medium. These and other embodiments may each optionally include one or more of the following features.

In some implementations, the series of frequency-modulated chirps having the respective frequencies across the frequency range are modulated linearly with respect to time.

In some implementations, the two-dimensional frequency-swept spectral signature includes powers of the series of reflections measured at the respective frequencies across the frequency range.

In some implementations, generating the two-dimensional frequency-swept spectral signature includes determining a product of the series of frequency-modulated chirps and the series of reflections; and analyzing, using an analog to digital converter, the product at the respective frequencies across the frequency range.

In some implementations, the analog to digital converter uses a fast Fourier transform.

In some implementations, the receiving the output representing the predicted classification of the object includes scaling at least one reference signal; and matching, using least squares, the two-dimensional frequency-swept spectral signature to the at least one reference signal.

In some implementations, the output representing a predicted classification of the object includes a certainty that the object is airfield debris.

In some implementations, the output representing a predicted classification of the object includes a severity of the object for a given state of the airfield.

In some implementations, the severity of the object is based on at least one of the size or material of the object.

The subject matter described in this specification can be implemented to realize one or more of the following advantages. The disclosed method enables improvement to the detection and classification of small changes (e.g., angularly small relative to the system) to an environment by using RF reflection. For example, small objects can be identified in complicated and/or noisy environments. In some implementations, properties of objects can be more precisely classified by using specially trained machine learning models. In some implementations, a radar system can have a small form factor which enhances mobility of the system (e.g., the system can be deployable at different locations). In some implementations, the radar system can improve resolution by including directed (e.g., focused) antennae and/or enhanced signal processing. In some implementations, the radar system can have a reduced cost by including less expensive materials. In some implementations, the form factor of the radar system can allow for components to be easily upgraded.

The details of one or more implementations of the subject matter described in this disclosure are set forth in the accompanying drawings and the description. Other features, aspects, and advantages of the subject matter will become apparent from the description, the drawings, and the claims.

3

FIG. 6 is a flow chart of an example process for classifying airfield debris.

DETAILED DESCRIPTION

Foreign object debris (FOD) can be detected and differentiated from non-debris from an airfield (e.g., aircraft runway). For example, frequency modulated continuous wave (FMCW) radar with a programmable chirp frequency range can be used to classify objects. The carrier frequency of the FMCW radar can then be swept through a wide range of frequencies to form a spectral signature of the objects. A machine learning classifier can predict characteristics of objects using the spectral signature. For example, the spectral signature can be matched using learned pattern recognition for identification and classification. In such an example, the pattern recognition can use a database of signatures corresponding to reflections from different objects.

In some implementations, the radar system can gather information for identifying objects, and determine the severity of FOD. For example, some classifications of aircraft (e.g., heavy, cargo) are unaffected by some debris, while some aircraft (e.g., small, jet) are sensitive (e.g., have low resilience) to debris.

Example uses of the radar system include providing information-rich measurement data to characterize, identify, and/or classify a variety of objects (e.g., solids, liquids, gases, surfaces, cracks, holes, electronic systems, and/or physical systems). In some examples, the radar system can provide detection, ranging, and classification of aircraft, missiles, drones, and other objects in the sky. In some examples, the radar system can be used for weather and wind profiling. In some examples, the radar system can determine surface degradation (e.g., objects, runway degradation, cracks, potholes) of roads and driveways (e.g., as part of an autonomous vehicle system).

Figure 1:
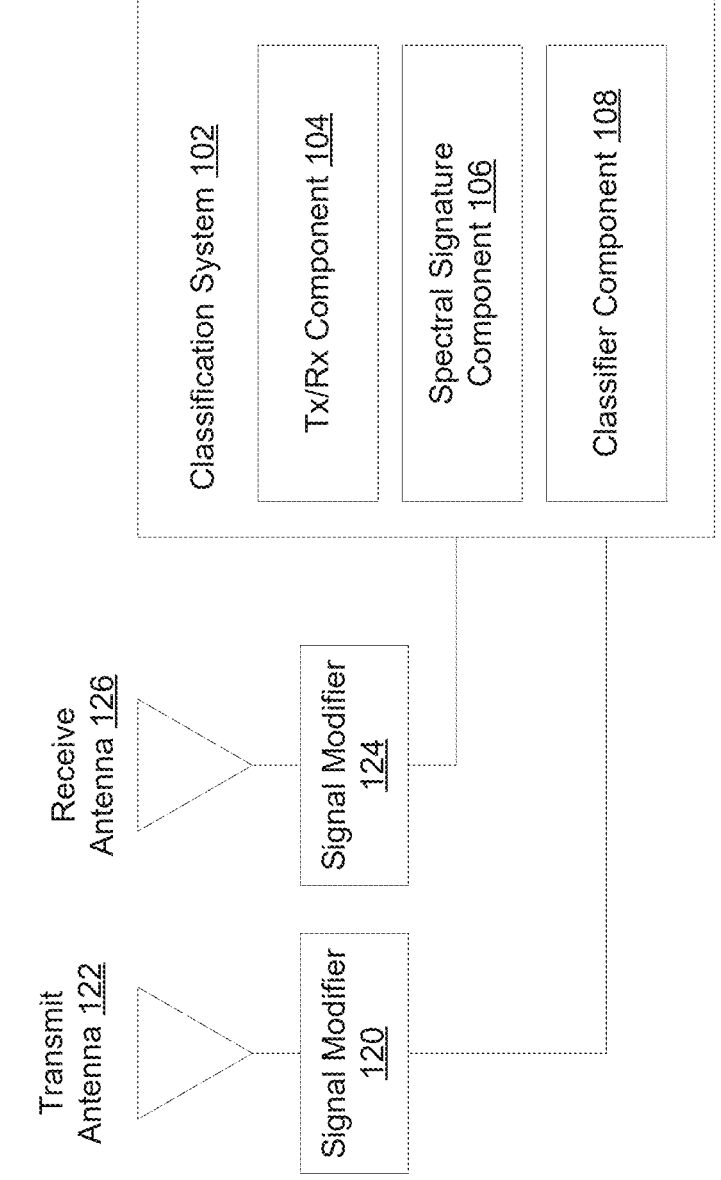
FIG. 1 shows an example radar system for classifying airfield debris, in accordance with some embodiments of the invention.

FIG. 1 shows an example radar system 100 for classifying airfield debris, in accordance with some embodiments of the invention. For example, the radar system 100 may include a FMCW radar. The radar system 100 can include a classification system 102, a transmit antenna 122, and a receive antenna 126. A data path between the classification system 102 and the transmit antenna 122 can include a signal modifier 120. A data path between the classification system 102 and the receive antenna 126 can include a signal modifier 124.

In some embodiments, the transmit antenna 122 and the receive antenna 126 can be arranged in a fixed spatial configuration relative to one another. In some embodiments, the transmit antenna 122 and the receive antenna 126 can be arranged so that they are in the same plane. In other embodiments, the transmit antenna 122 and the receive antenna 126 may not be on substantially the same plane. For example, the transmit antenna 122 may be on a first plane and the receive antenna 126 may be on a second plane. The first plane and second plane may be parallel to one another. Alternatively, the first and second planes need not be parallel, and may intersect one another. In some cases, the first plane and second plane may be perpendicular to one another.

The classification system 102 can include a transmit and receive (Tx/Rx) component 104. The Tx/Rx component 104 can generate an RF signal (e.g., a beat signal), and transmit the RF signal to transmit antenna 122 through signal modifier 120. A modified signal can be broadcast by the antenna 122 into the environment. The Tx/Rx component 104, signal modifier 120, and transmit antenna 122 can be included in a radar transmit subsystem. The radar transmit subsystem (e.g., antenna 122) can be directed toward a location of an object in an airfield. The radar transmit subsystem can generate a series of frequency-modulated chirps having respective frequencies across a frequency range.

In some embodiments, the classification system 102 emits a signal whose frequency is modulated linearly with respect to time from the transmitting antenna. The series of frequency-modulated chirps having the respective frequencies across the frequency range can be modulated linearly with respect to time.

In some embodiments, the signal modifier 120 can modify a signal generated by the Tx/Rx component 104 before the modified signal is broadcast by the transmit antenna 122. For example, the signal modifier 120 can include a power amplifier and/or a band pass filter. In some examples, the signal modifier 120 can include a phase shifting network, such as a Rotman lens and/or a linear antennas array.

Figure 2:
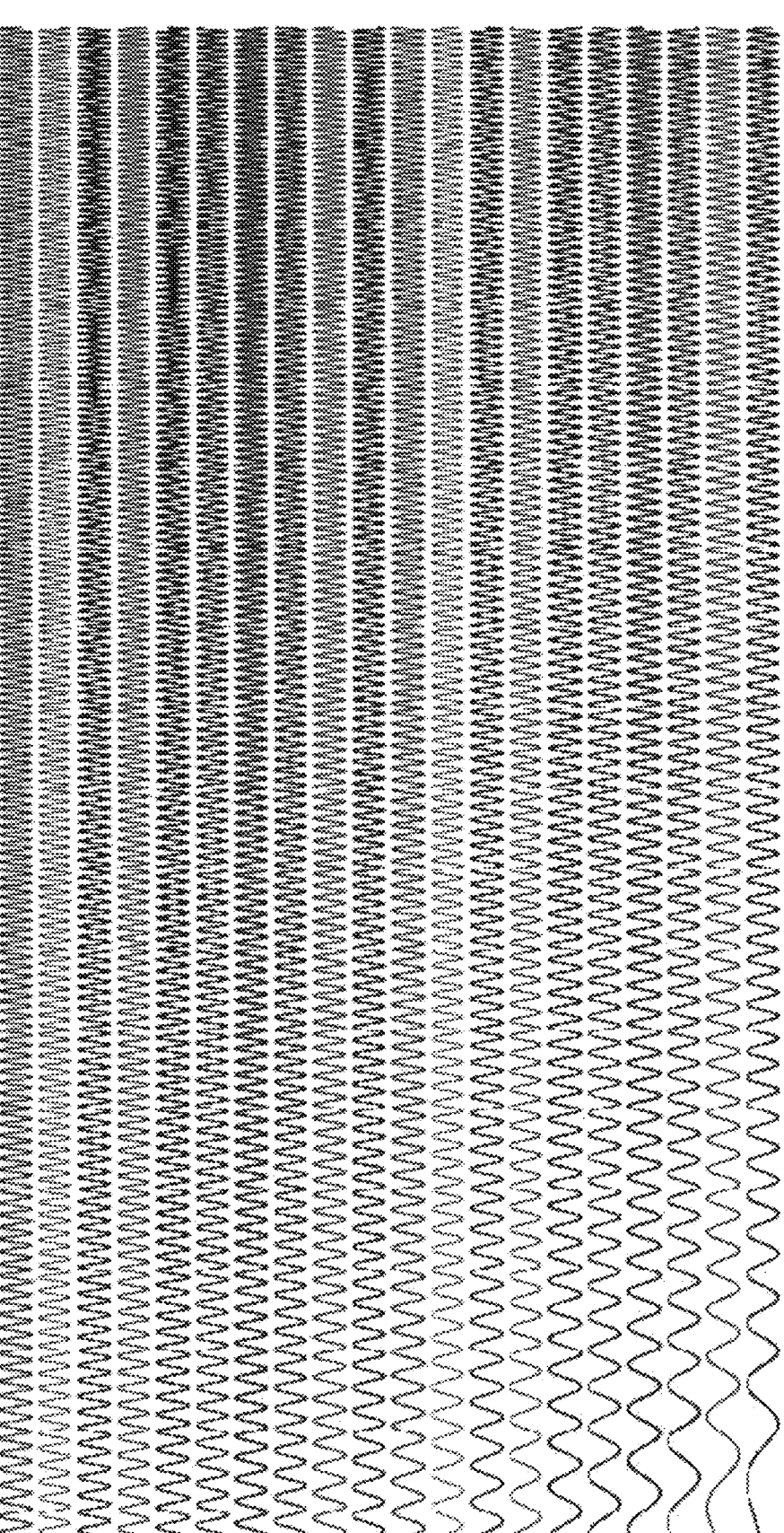
FIG. 2 illustrates an example image constructed from frequencies modulated signals emitted by a radar system

FIG. 2 illustrates an example image constructed from frequencies modulated signals emitted by a radar system (e.g., a radar system that is the same as or similar to the radar system 100 of FIG. 1). The images show examples of different frequency modulated signals that each occupy different frequency bands (e.g., chirps, sweeps). The example frequency modulated signal, from the top to bottom, each has a linearly decreasing start and stop frequency, and each frequency modulated signal has unique spectral content.

Returning to FIG. 1, the radar system 100 can receive from the environment incoming signals that include reflections of the transmitted chirps and/or noise. The incoming signals can be received by the receive antenna 126 and transmitted to the Tx/Rx component 104 through signal modifier 124. The Tx/Rx component 104, signal modifier 124, and receive antenna 126 can be included in a radar receive subsystem. The radar receive subsystem can receive a series of reflections corresponding to a plurality of frequency-modulated chirps in the series of frequency-modulated chirps.

The Tx/Rx component 104 can receive modified signals from the signal modifier 124 representing possible reflections of the transmitted chirps from objects in the range and path of the radar system 100. The signal modifier 124 can include a band pass filter, a low noise amplifier, and/or a limiting amplifier. In some examples, the signal modifier 124 can include a phase shifting network, such as a Rotman lens and/or a linear antennas array.

In some embodiments, one or more of Tx/Rx component 104, spectral signature component 106, and classifier component 108 may be stand-alone circuit elements. In some embodiments, one or more of Tx/Rx component 104, spectral signature component 106, and classifier component 108 may be embedded on a common FPGA, ASIC or other logic element with one or more of the other components.

In some embodiments, classification system 102 can include a network in which one or more of Tx/Rx component 104, spectral signature component 106, and classifier component 108 are located separately from other elements of radar system 100. Separately located components may communicate with other elements through wired and/or wireless communication protocols (e.g., the internet, WiFi, Bluetooth, Ethernet, Fiber-Optics). For example, spectral signature component 106 may be communicably coupled to Tx/Rx component 104 and/or classifier component 108. In some examples, classifier component 108 may be communicably coupled to Tx/Rx component 104 and/or spectral signature component 106. In some examples, spectral signature component 106 and/or classifier component 108 can be located on a remote server computing device.

The classification system 102 can include a spectral signature component 106. The spectral signature component 106 can generate a two-dimensional frequency-swept spectral signature representing properties of the plurality of received reflections across the frequency range. The spectral signature can be generated from the plurality of received reflections across a frequency range. In some implementations, the two-dimensional frequency-swept spectral signature can include powers of the series of reflections measured at the respective frequencies across the frequency range. For example, frequency dependent reflections can be observed in the power spectrum of the beat frequency output of the radar system 100 across a series of chirps.

In some implementations, generating spectral signatures can include determining a product of the series of frequency-modulated chirps and the series of reflections. The spectral signature component 106 can include a mixer, and the emitted frequency ramp signal can be routed to the mixer to be mixed with the received return signal. The mixer can output the product of the transmitted signal and the received signal. For example, if the radar system 100 is directed toward an ideal point target within a detection range of the radar system, then the mixer can output a single tone beat frequency. In some implementations, the spectral signature component 106 can analyze the product of the series of frequency-modulated chirps and the series of reflections at the respective frequencies across the frequency range by using an analog to digital converter. In some implementations, the analog to digital converter (ADC) uses a fast Fourier transform (FFT). For example, the mixer output can be fed into an ADC for frequency analysis such as an FFT. Power measured at one or multiple frequencies can correspond to reflections from targets at different distances.

In some implementations, the integrated power of a beat frequency generated by a stationary ideal point target for the duration of a reflected chirp is proportional to the integrated power of the chirp's frequency content. For example, if the target is a real target with volume and a 3D shape, it can exhibit effects such as diffraction, Mie scattering, and constructive/destructive interference that are frequency dependent. Other properties of the target object (e.g., conductivity, resonances, dielectric losses) can be frequency dependent and affect the power reflected by the object from different frequencies broadcast by the radar system 100.

Figure 3:
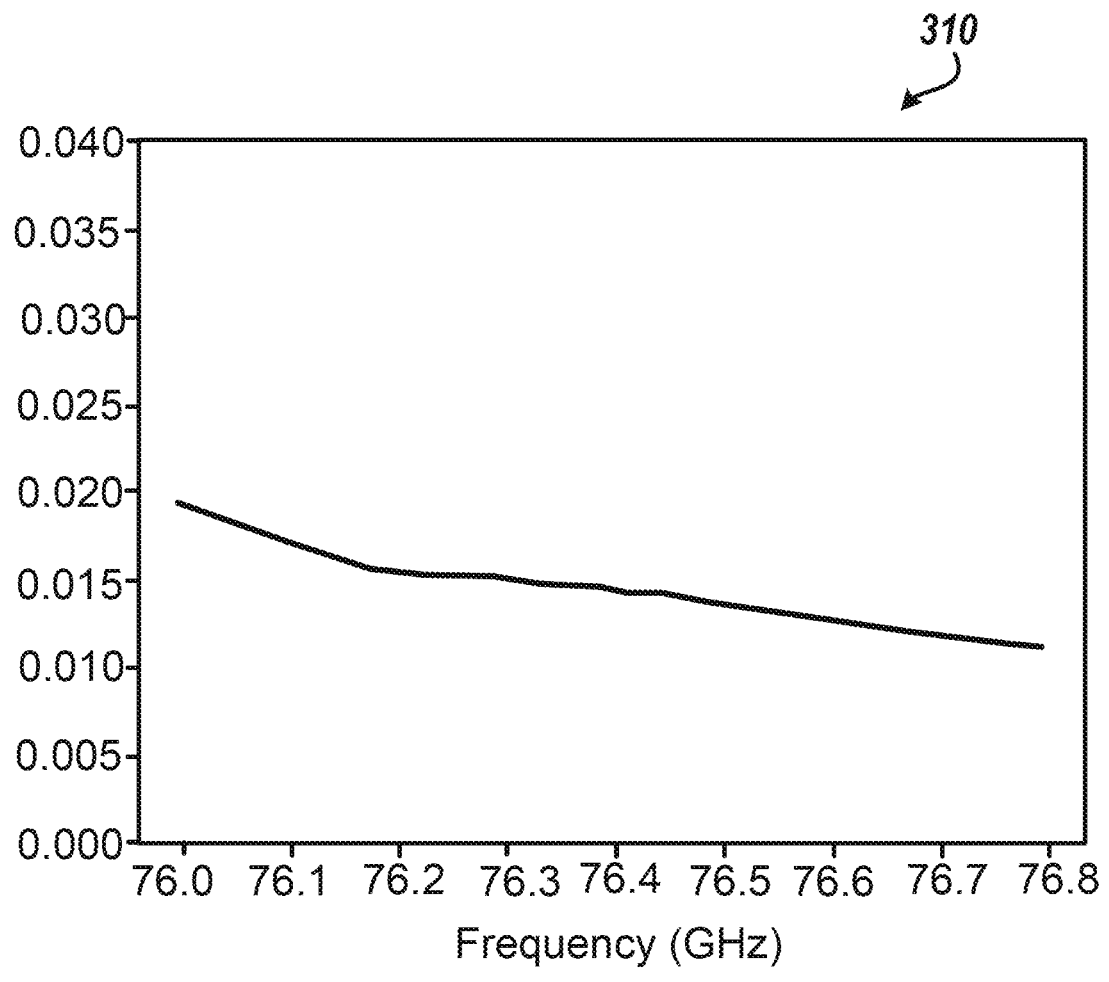
FIG. 3 illustrates an example image constructed from a spectral signature measured from reflections from a smooth ball.
Figure 3:
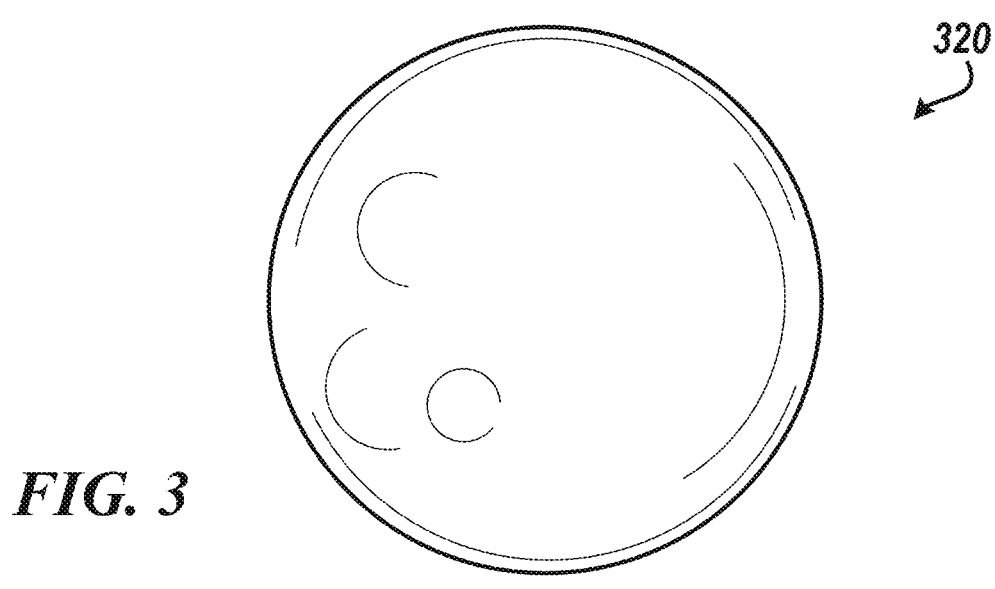

FIG. 3 illustrates an example image constructed from a spectral signature measured from reflections from a smooth ball. Smooth ball 320 can be a steel ball bearing. The spectral signature can be captured for the smooth ball 320 at an appropriate distance to represent an object to be classified as possible FOD. For example, the smooth ball 320 can be located on an airfield (e.g., runway) and can be measured from near an edge of the airfield (e.g., control tower, terminal, hanger). In some examples, the spectral signature can be measure while the smooth ball 320 is located on a test range at the appropriate distance. The horizontal axis of graph 310 represents a start frequency of an FMCW chirp, and the vertical axis of graph 310 represents a reflected power corresponding to the start frequency. As illustrated in the example of FIG. 3, the end frequency may always be 3.2 GHz above the start frequency. In some examples, narrower band chirps (e.g., where the start and end frequencies are further apart) may be used to allow for interrogation within a narrower range of distances from the radar system.

Figure 4:
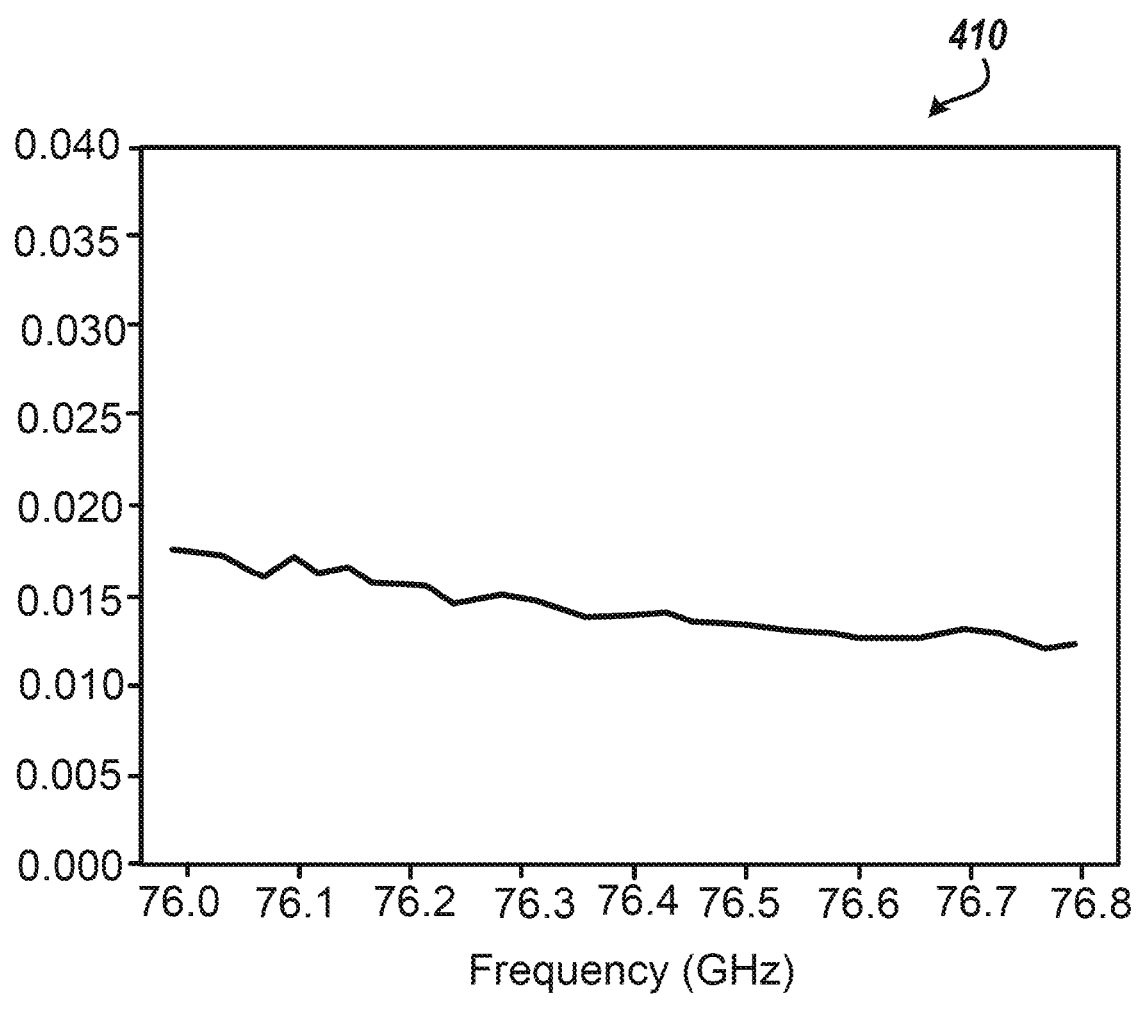
FIG. 4 illustrates an example image constructed from a spectral signature measured from reflections from a dimpled ball.
Figure 4:
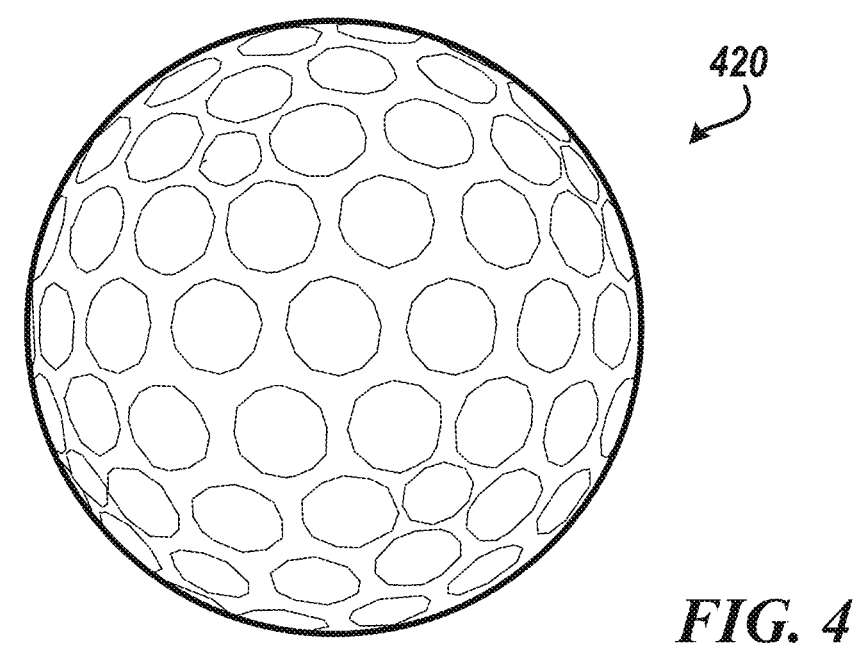

FIG. 4 illustrates an example image constructed from a spectral signature measured from reflections from a dimpled ball. Dimpled ball 420 can be a golf ball. The spectral signature can be captured for the dimpled ball 420 at an appropriate distance to represent an object to be classified as possible FOD. The horizontal axis of graph 410 represents a start frequency of an FMCW chirp, and the vertical axis of graph 410 represents a reflected power corresponding to the start frequency. As illustrated in the example of FIG. 4, the end frequency may always be 3.2 GHz above the start frequency. In some examples, narrower band chirps (e.g., where the start and end frequencies are further apart) may be used to allow for interrogation within a narrower range of distances from the radar system.

In some implementations, the techniques for capturing the spectral signatures can be used to distinguish between objects (e.g., distinguish between the smooth ball 320 and the dimpled ball 420). For example, the radar system can be trained to identify certain objects (e.g., metal ball, ceramic ball) based on the spectral signature (e.g., the power levels at various frequencies). Similar techniques can be used to distinguish actual airfield debris (e.g., metal parts) from other objects which do not affect the operations of the airfield (e.g., fallen leaves). For example, a machine learning classifier can be trained using spectral signatures of debris and non-debris objects. In such an example, the trained classifier can predict whether an input spectral signature corresponds to airfield debris.

Returning to FIG. 1, classification system 102 can include a classifier component 108. The classifier component 108 can include a machine learning classifier that is trained to predict characteristics of objects from frequency-swept spectral signatures. For example, the machine learning classifier can include a neural network. The machine learning classifier can be trained using a database of spectral signatures corresponding to objects with known properties.

The two-dimensional frequency-swept spectral signature generated by the spectral signature component 106 can be provided as an input to the classifier component 108. The classifier component 108 can generate an output representing a predicted classification of the object as airfield debris or not airfield debris. In some implementations, the output representing a predicted classification of the object can include a certainty that the object is airfield debris.

In some implementations, the output representing a predicted classification of the object can include a severity of the object for a given state of the airfield. In some implementations, the severity of the object is based on at least one of the size, hardness, or material of the object (e.g., metal, fiberglass, plastic, composite, foam). The state of the airfield can include classifications of one or more aircraft scheduled to take off and/or land on a runway. In some embodiments, the severity can include a level corresponding to aircraft classifications. For example, debris with a given severity level may be acceptable for aircraft larger than the corresponding aircraft classification. For example, aircraft classifications can include light, medium, heavy, super, cargo, and/or passenger. In some embodiments, the severity level can be determined if the size, hardness, or a combination of these satisfies (e.g., is greater than) one or more threshold values.

In some implementations, receiving the output representing the predicted classification of the object can include scaling at least one reference signal (e.g., from a database of reference signal). The classifier component 108 can match the two-dimensional frequency-swept spectral signature to the at least one scaled reference signal (e.g., using least squares).

7

8

Figure 5:
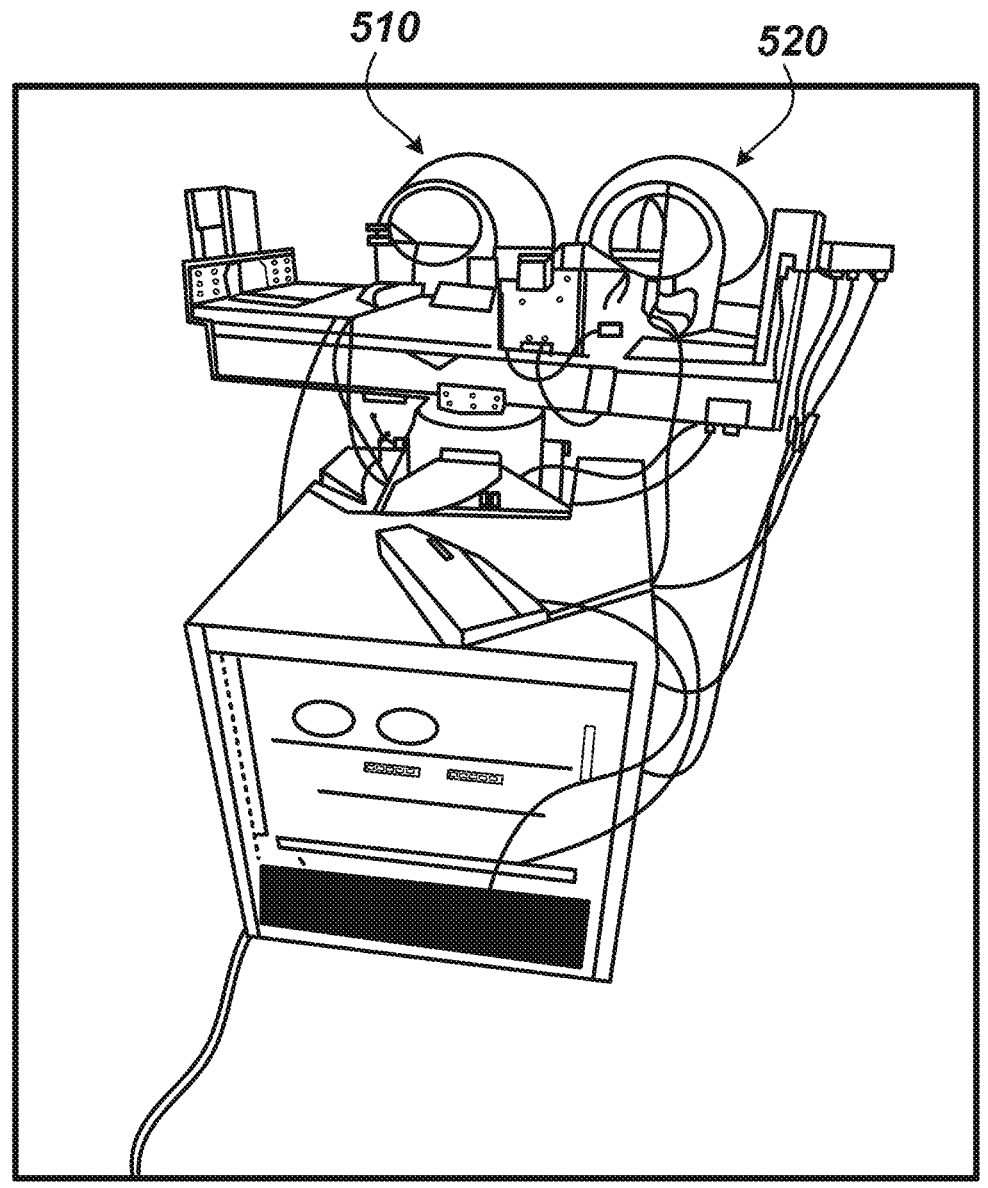
FIG. 5 illustrates an example image of a radar system for classifying airfield debris.

FIG. 5 illustrates an example image of a radar system 500 for classifying airfield debris. In some embodiments, the radar system 500 can the same or similar to radar system 100 of FIG. 1. The radar system can include a transmit antenna 510 and a receive antenna 520. In some implementations, the transmit antenna 510 and the receive antenna 520 are both directed toward an object to be classified. The radar system 500 can scan airport runways and perform spectral measurements.

FIG. 6 is a flow chart of an example process 600 for classifying airfield debris. The example process 600 can be performed, for example, by one or more systems, such as those described with reference to FIG. 1 (e.g., a radar system that is the same or similar to radar system 100, a classification system that is the same or similar to the classification system 102). The example process 600 can also be implemented as instructions stored on a non-transitory, computer-readable medium that, when executed by one or more telecommunications devices configures the one or more telecommunications devices to perform and/or cause the one or more telecommunications devices to perform the actions of the example process 600.

A radar system directed toward a location of an object in an airfield generates a series of frequency-modulated chirps having respective frequencies across a frequency range (602).

The radar system receives a series of reflections corresponding to a plurality of frequency-modulated chirps in the series of frequency-modulated chirps (604).

The radar system generates, from the plurality of received reflections across a frequency range, a two-dimensional frequency-swept spectral signature representing properties of the plurality of received reflections across the frequency range (606).

The radar system provides the two-dimensional frequency-swept spectral signature as input to a machine learning classifier that is trained to predict characteristics of objects from frequency-swept spectral signatures (608).

The radar system receives, from the machine learning classifier, an output representing a predicted classification of the object as airfield debris or not airfield debris (610).

The example process 600 shown in FIG. 6 can be modified or reconfigured to include additional, fewer, or different actions (not shown in FIG. 6), which can be performed in the order shown or in a different order. In some implementations, one or more of the actions can be repeated or iterated, for example, until a terminating condition is reached. In some implementations, one or more of the individual actions shown in FIG. 6 can be executed as multiple separate actions, or one or more subsets of the actions shown in FIG. 6 can be combined and executed as a single action.

The systems and components (e.g., classification system 102, Tx/Rx component 104, spectral signature component 106, classifier component 108) described herein can be implemented by one or more processors. In some embodiments, the one or more processors may be a programmable processor (e.g., a central processing unit (CPU), a graphic processing unit (GPU), a general-purpose processing unit or a microcontroller), in the form of fine-grained spatial architectures such as a field programmable gate array (FPGA), an application-specific integrated circuit (ASIC), and/or one or more Advanced RISC Machine (ARM) processors. In some embodiments, the processor may be a processing unit of a computer system.

As used herein A and/or B encompasses one or more of A or B, and combinations thereof such as A and B. It will be understood that although the terms "first," "second," "third" etc. are used herein to describe various elements, components, regions and/or sections, these elements, components, regions and/or sections should not be limited by these terms. These terms are merely used to distinguish one element, component, region or section from another element, component, region or section. Thus, a first element, component, region or section discussed herein could be termed a second element, component, region or section without departing from the teachings of the present invention.

While this specification contains many specific implementation details, these should not be construed as limitations on the scope of any inventions or of what may be claimed, but rather as descriptions of features specific to particular embodiments of particular inventions. Certain features that are described in this specification, in the context of separate embodiments, can also be implemented in combination or in a single embodiment. Conversely, various features that are described in the context of a single embodiment can also be implemented in multiple embodiments, separately, or in any suitable subcombination. Moreover, although features may be described above as acting in certain combinations and even initially claimed as such, one or more features from a claimed combination can in some cases be excised from the combination, and the claimed combination may be directed to a subcombination, or variation of a subcombination.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A method for classifying airfield debris comprising:
generating, using a radar transmit subsystem directed toward a location of a same object in an airfield, a series of frequency-modulated chirps across a same frequency range, each frequency-modulated chirp from the series of frequency-modulated chirps having a different respective portion of frequencies from the same frequency range than another respective portion of frequencies for another frequency-modulated chirp in the series of frequency-modulated chirps;
receiving, using a radar receive subsystem, a series of reflections reflected from the same object and that correspond to a plurality of frequency-modulated chirps in the series of frequency-modulated chirps;
generating, from the series of reflections across the same frequency range, a two-dimensional frequency-swept spectral signature representing frequency-dependent features of the same object derived from the series of reflections across the same frequency range, wherein the two-dimensional frequency-swept spectral signature is an image comprising a first dimension representing the same frequency range and a second dimension representing powers of the series of reflections measured at the respective frequencies across the same frequency range;
providing the two-dimensional frequency-swept spectral signature of the same object as input to a machine learning classifier that is trained to predict characteristics of objects from frequency-swept spectral signatures; and receiving, from the machine learning classifier, an output representing a predicted classification of the same object as airfield debris or not airfield debris.

2. The method of claim 1, wherein the series of frequency-modulated chirps having the respective portions of frequencies across the same frequency range are modulated linearly with respect to time.

3. The method of claim 1, wherein generating the two-dimensional frequency-swept spectral signature comprises:

determining a product of the series of frequency-modulated chirps and the series of reflections; and analyzing, using an analog to digital converter, the product at the respective portions of frequencies across the same frequency range.

4. The method of claim 3, wherein the analog to digital converter uses a fast Fourier transform.

5. The method of claim 3, wherein the product of the series of frequency-modulated chirps and the series of reflections comprises a single tone beat frequency resulting from the same object.

6. The method of claim 1, wherein receiving the output representing the predicted classification of the same object comprises:

scaling at least one reference signal; and matching, using least squares, the two-dimensional frequency-swept spectral signature to the at least one reference signal.

7. The method of claim 1, wherein the output representing a predicted classification of the same object comprises a certainty that the same object is airfield debris.

8. The method of claim 1, wherein the output representing a predicted classification of the same object comprises a severity of the same object for a given state of the airfield.

9. The method of claim 8, wherein the severity of the same object is based on at least one of (i) size or (ii) material, of the same object.

10. The method of claim 1, wherein generating the two-dimensional frequency-swept spectral signature comprises:

determining, for a particular chirp in the plurality of frequency-modulated chirps reflected from the same object, that a power of a beat frequency generated by the same object for a duration of the particular chirp is proportional to a power of frequency content in a transmitted chirp from the series of frequency modulated chirps.

11. A radar system comprising one or more processors and one or more storage devices storing instructions that when executed by the one or more processors cause the one or more processors to perform operations comprising:

generating a series of frequency-modulated chirps i) having respective frequencies across a frequency range across a same frequency range and ii) directed toward a location of a same object in an airfield, each frequency-modulated chirp from the series of frequency-modulated chirps having a different respective portion of frequencies from the same frequency range than another respective portion of frequencies for another frequency-modulated chirp in the series of frequency-modulated chirps;

receiving a series of reflections reflected from the same object and that correspond to a plurality of frequency-modulated chirps in the series of frequency-modulated chirps;

generating, from the series of reflections across the same frequency range, a two-dimensional frequency-swept spectral signature representing frequency-dependent features of the same object derived from the series of reflections across the same frequency range, wherein the two-dimensional frequency-swept spectral signature is an image comprising a first dimension representing the same frequency range and a second dimension representing powers of the series of reflections measured at the respective frequencies across the same frequency range; and providing the two-dimensional frequency-swept spectral signature of the same object as input to a machine learning classifier that is trained to predict characteristics of objects from frequency-swept spectral signatures; and receiving, from the machine learning classifier, an output representing a predicted classification of the same object as airfield debris or not airfield debris.

12. The radar system of claim 11, wherein the series of frequency-modulated chirps having the respective portions of frequencies across the same frequency range are modulated linearly with respect to time.

13. The radar system of claim 11, wherein generating the two-dimensional frequency-swept spectral signature comprises:

determining a product of the series of frequency-modulated chirps and the series of reflections; and analyzing, using an analog to digital converter, the product at the respective portions of frequencies across the frequency same range.

14. The radar system of claim 13, wherein the analog to digital converter uses a fast Fourier transform.

15. The radar system of claim 11, wherein receiving the output representing the predicted classification of the same object comprises:

scaling at least one reference signal; and matching, using least squares, the two-dimensional frequency-swept spectral signature to the at least one reference signal.

16. The radar system of claim 11, wherein the output representing a predicted classification of the same object comprises a certainty that the same object is airfield debris.

17. The radar system of claim 11, wherein the output representing a predicted classification of the same object comprises a severity of the same object for a given state of the airfield.

18. The radar system of claim 17, wherein the severity of the same object is based on at least one of (i) size or (ii) material, of the same object.

19. A non-transitory computer storage medium encoded with instructions that, when executed by one or more processors, cause the one or more processors to perform operations comprising:

generating a series of frequency-modulated chirps i) having respective frequencies across a same frequency range and ii) directed toward a location of a same object in an airfield, each frequency-modulated chirp from the series of frequency-modulated chirps having a different respective portion of frequencies from the same frequency range than another respective portion of frequencies for another frequency-modulated chirp in the series of frequency-modulated chirps;

receiving a series of reflections reflected from the same object and that correspond to a plurality of frequency-modulated chirps in the series of frequency-modulated chirps;

generating, from the series of reflections across the same frequency range, a two-dimensional frequency-swept spectral signature representing frequency-dependent features of the same object derived from the series of reflections across the same frequency range, wherein the two-dimensional frequency-swept spectral signature is an image comprising a first dimension representing the same frequency range and a second dimension representing powers of the series of reflections measured at the respective frequencies across the same frequency range; and providing the two-dimensional frequency-swept spectral signature of the same object as input to a machine learning classifier that is trained to predict characteristics of objects from frequency-swept spectral signatures; and receiving, from the machine learning classifier, an output representing a predicted classification of the same object as airfield debris or not airfield debris.

20. The non-transitory computer storage medium of claim 19, wherein the series of frequency-modulated chirps having the respective portions of frequencies across the same frequency range are modulated linearly with respect to time.

\* \* \* \* \*